United States Patent
Bell

(10) Patent No.: US 8,875,436 B1
(45) Date of Patent: Nov. 4, 2014

(54) BAIT BUCKET CONFIGURABLE TO TRANSPORT BAIT IN BOTH LIQUID AND SOLID MEDIAS

(76) Inventor: Esco Bell, Margate, FL (US)

( * ) Notice: Subject to any disclaimer, the term of this patent is extended or adjusted under 35 U.S.C. 154(b) by 421 days.

(21) Appl. No.: 13/475,311

(22) Filed: May 18, 2012

(51) Int. Cl.
*A01K 97/04* (2006.01)

(52) U.S. Cl.
USPC .................................................. 43/56; 43/55

(58) Field of Classification Search
USPC ............................................... 43/56, 55, 54.1
See application file for complete search history.

(56) References Cited

U.S. PATENT DOCUMENTS

| | | | | |
|---|---|---|---|---|
| 513,740 A * | 1/1894 | Kies | ................................ | 43/56 |
| 647,257 A * | 4/1900 | Gray | ................................ | 43/57 |
| 3,726,039 A * | 4/1973 | Borrelli | ........................... | 43/56 |
| 3,834,062 A * | 9/1974 | Nalepka | .......................... | 43/56 |
| 5,138,975 A * | 8/1992 | Walsh | ........................... | 119/203 |
| 5,799,434 A * | 9/1998 | Krieger et al. | ............... | 42/69.03 |
| 6,857,222 B1 * | 2/2005 | King | ................................ | 43/56 |
| 7,644,535 B2 * | 1/2010 | Sloop | ................................ | 43/56 |

* cited by examiner

*Primary Examiner* — Christopher P Ellis
(74) *Attorney, Agent, or Firm* — Gulf Coast Intellectual Property Group

(57) ABSTRACT

A live bait container operable to store at least two different types of live bait wherein each of the two different types of live bait live in different media. Additionally, the live bait container is configured with a plurality of internal dividers operable to fluidly couple adjacent portions so as to accommodate incompatible live baits that are stored in the same media. The plurality of internal dividers include three layer having a plurality of apertures wherein one of the three layer is movable so as to align the plurality of apertures thus allowing the fluid coupling of two adjacent portions. A keeper is present to control the movement of the movable layer of the plurality of internal dividers. A top is present having a ring-shaped slot operable to receive a portion of the keeper.

20 Claims, 2 Drawing Sheets

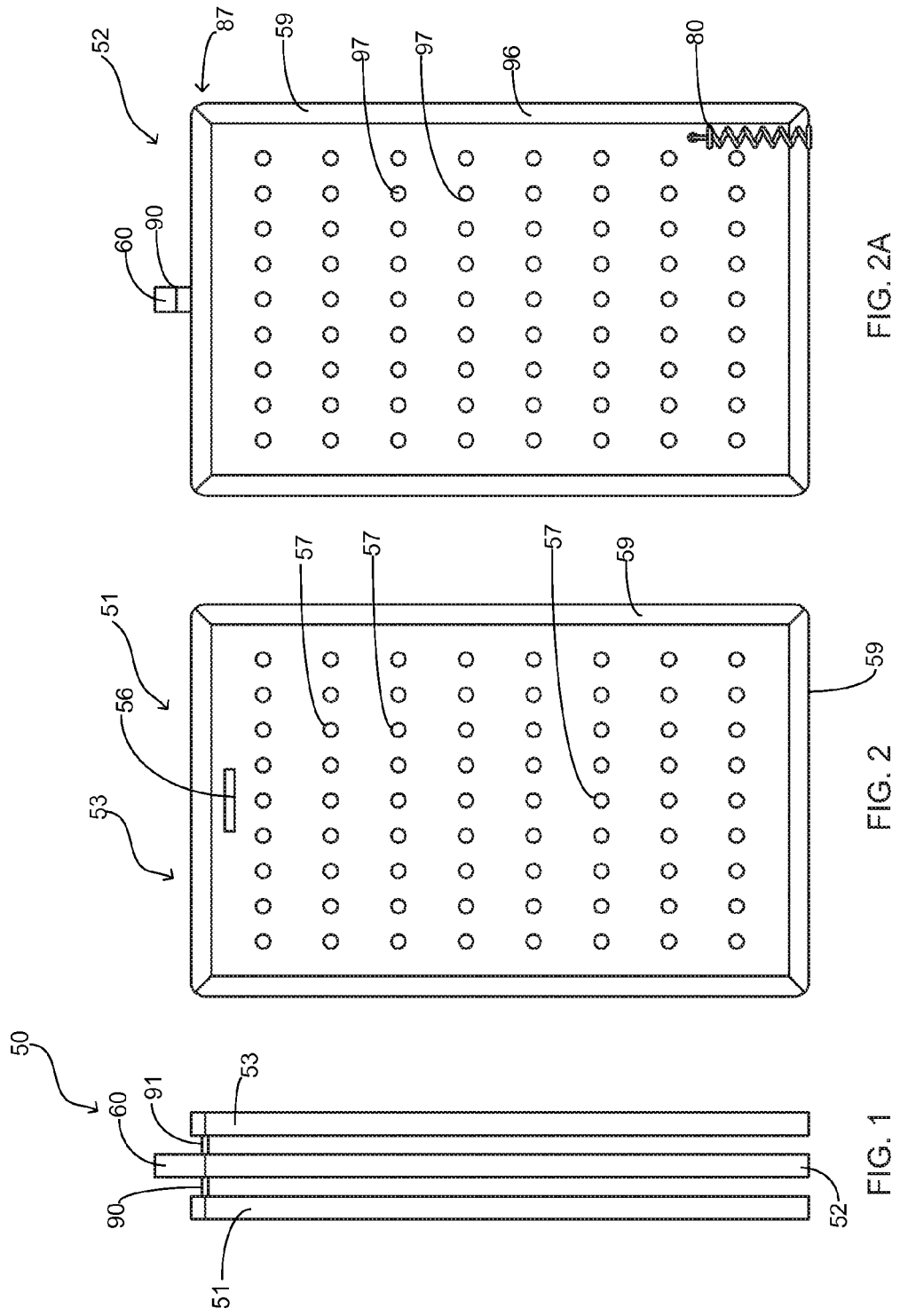

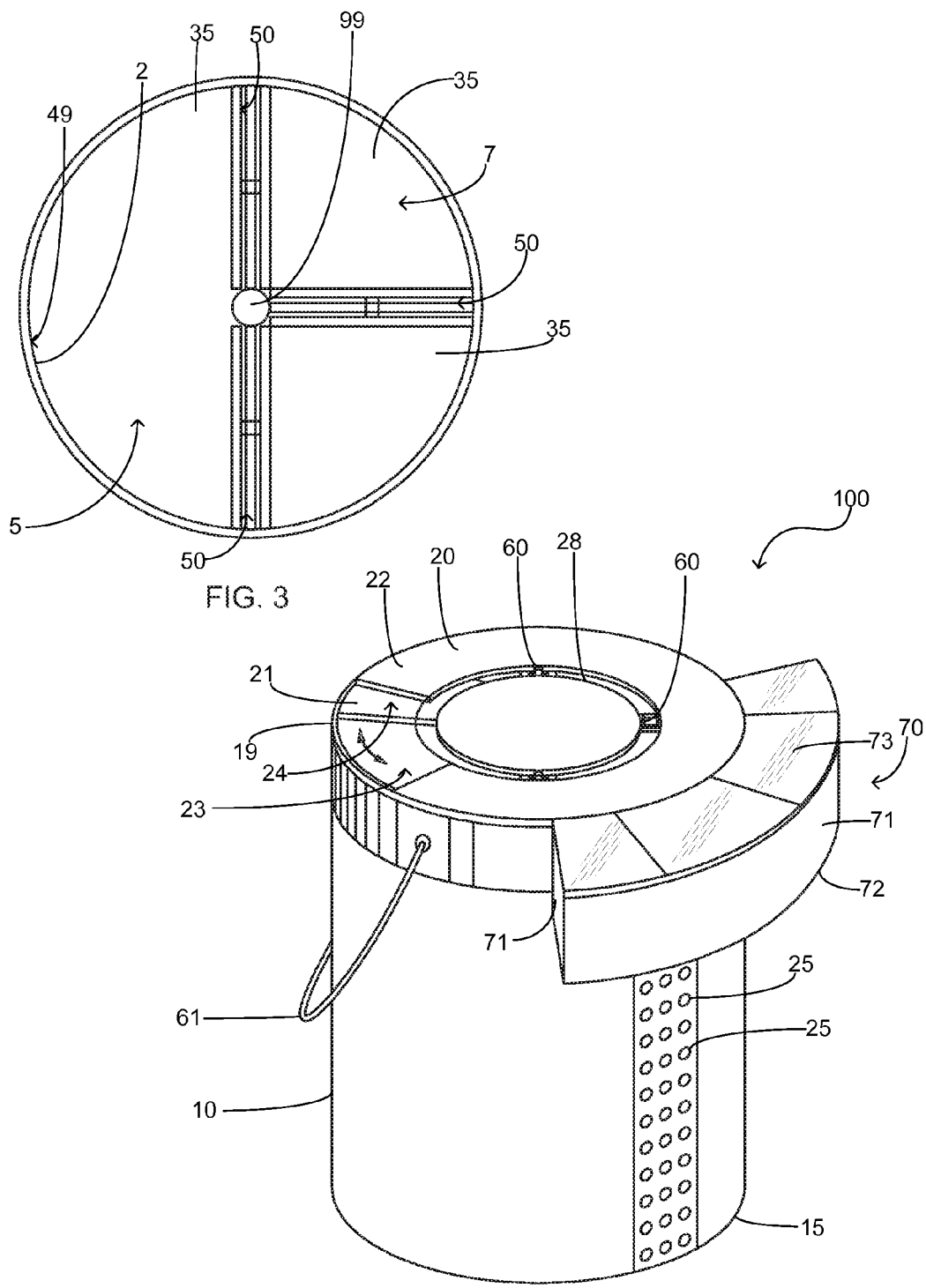

US 8,875,436 B1

BAIT BUCKET CONFIGURABLE TO TRANSPORT BAIT IN BOTH LIQUID AND SOLID MEDIAS

FIELD OF THE INVENTION

The present invention relates generally to bait transportation, more specifically but not by way of limitation, a bait bucket that includes a plurality of internal dividers wherein the internal dividers are configurable to create a multitude of compartments and wherein the internal dividers can be configured to allow a bait storage media to pass therethrough.

BACKGROUND

Millions of individuals routinely engage in outdoor activities. One outdoor activity that in which millions of people regularly participate is fishing. There are many types of sport-fishing that are typically regulated by local regulations but the most common type of sport-fishing typically involves the use of a rod and reel combination wherein the rod and reel is configured with a line having a hook on one end of the line. It is common to have releasably secured to the hook some type of a bait in order to attempt to lure a fish a potentially catch the fish. There are many types of bait available on the marketplace ranging from artificial lures, dead bait and live bait. Many fishermen prefer the use of live bait, as they believe that the live bait attracts and provide the potential to catch the most fish.

Live bait is typically either purchased at a local bait shop or caught by the fisherman using various techniques. Different types of live bait can be utilized ranging from small baitfish to worms. The live bait is typically stored in the media in which in was caught, in most cases either water, fresh or saltwater and/or moist soil such as is the case for worms. This live bait is typically transported in containers known as bait bucket or other similar device to the location at which the fisherman will fish and utilize the live bait.

One issue with live bait is that it needs to survive from the time of acquisition and last until the fishing trip is completed. Live bait such as small bait fish are fragile and must be kept alive by providing sufficient space within the bait container to allow the bait to swim freely while facilitating an oxygen exchange at the surface of the water. One problem with existing live bait containers is the inability to configure the volume of internal compartments so as to adequately store the amount of baitfish purchased.

Another issue with current bait containers is their inability to accommodate at the same time different types of live bait that live and are stored in different media. For example but not by way of limitation, worms are typically stored in a moist soil while baitfish, either fresh water or saltwater are stored in water. While bait containers exist that allow one type of bait to be stored and transported, no bait container exists that is configurable to transport multiple types of live bait that require different media such as but not limited to soil and water.

Additionally, many fisherman will purchase different types of bait that may live in the same media, such as water, but not be compatible thus requiring the purchase of an additional bait container. For example but not by way of limitation, if a fisherman desires to utilize pinfish and shrimp as live bait for a fishing trip, if carried in the same bait container the pinfish will typically eat or engage with the shrimp in a manner that is harmful to the shrimp thereby diminishing their quality as a live bait.

Accordingly, there is a need for a live bait container that includes configurable internal dividers that can be arranged to create internal compartments of different volumes and wherein the internal dividers facilitate the passing of certain media therethrough.

SUMMARY OF THE INVENTION

It is the object of the present invention to provide a live bait container that is operable to store and transport live bait having at least one wall and a bottom configured to form an interior volume suitable in size to transport a plurality of live bait.

Another object of the present invention is to provide a live bait container that further includes a plurality of internal dividers that are configurable to separate the interior volume of the live bait container into a multitude of smaller compartments.

Yet another object of the present invention is to provide a live bait container wherein the plurality of internal dividers are comprised of a first layer, second layer and a third layer.

Still another object of the present invention is to provide a live bait container having a plurality of internal dividers wherein the first layer, second layer and third layer include a multitude of apertures to allow liquid media to pass therethrough.

An additional object of the present invention is to provide a live bait container having a plurality of internal dividers wherein the second layer is movable with respect to the first layer and third layer.

A further object of the present invention is to provide a live bait container that includes a plurality of internal dividers wherein the internal dividers are sealably configured proximate their perimeter to inhibit liquid from propagating therepast.

Still a further object of the present invention is to provide a live bait container having an internal compartment configurable to be subdivided into a multitude of compartments by a plurality of internal dividers wherein the second layer of the internal divider includes a keeper operable to transition the second layer between a first position and a second position.

Yet a further object of the present invention is to provide a live bait container that includes a top operable to be releasably secured to the opening of the internal compartment wherein the top is configured to accommodate a portion of the keeper secured to the second layer of the internal dividers.

To the accomplishment of the above and related objects the present invention may be embodied in the form illustrated in the accompanying drawings. Attention is called to the fact that the drawings are illustrative only. Variations are contemplated as being a part of the present invention, limited only by the scope of the claims.

BRIEF DESCRIPTION OF THE DRAWINGS

A more complete understanding of the present invention may be had by reference to the following Detailed Description and appended claims when taken in conjunction with the accompanying Drawings wherein:

FIG. 1 is an end view of the internal divider of the present invention; and

FIG. 2 is a side view of the first layer of the internal divider of the present invention; and FIG. 2A is a side view of the second layer of the internal divider of the present invention; and FIG. 3 is a top view of the present invention with the top removed from the opening of the internal compartment; and FIG. 4 is a perspective view of an embodiment of the present invention.

DETAILED DESCRIPTION

Referring now to the drawings submitted herewith, wherein various elements depicted therein are not necessarily drawn to scale and wherein through the views and figures like elements are referenced with identical reference numerals, there is illustrated live bait container 100 constructed according to the principles of the present invention.

Referring in particular to FIGS. 3 and 4, the live bait container 100 includes a wall 10, bottom 15 having an opening 7 providing access to the interior volume 5. A top 20 is releasably secured to the live bait container 100 so as to substantially cover the opening 7. The wall 10 and bottom 15 are integrally formed utilizing suitable durable techniques. The wall 10 is manufactured from a suitable durable materials such as but not limited to plastic. The wall 10 is formed in a generally annular manner. While in the preferred embodiment one wall 10 is formed in a generally annular manner so as to define the perimeter of the interior volume 5 of the live bait container 100, it is contemplated within the scope of the present invention that the live bait container 100 could be formed utilizing more than one wall 10 so as to form numerous different shapes having an interior volume. Journaled through the wall 10 are a plurality of apertures 25. The plurality of apertures 25 are generally annular in shape and are journaled through the wall 10 being proximate the bottom 15 traversing to proximate the upper perimeter edge 19. The plurality of apertures 25 function to allow water or other liquid media in which the live bait container 100 is substantially disposed to flow thereinto. The placement of the apertures 25 from the bottom 15 to the upper perimeter edge 19 facilitate improved flow and exchange of liquid media between the interior volume 5 and the liquid matter in which the live bait container 100 is disposed. As illustrated in FIG. 4, it the preferred embodiment, the apertures 25 are journaled in only in a portion of the external circumference of live bait container 100. This is preferred so as to allow the user to facilitate a liquid media exchange with only one of the internal compartments 35 if desired. While no specific amount of the circumference is required for journaling of the apertures 25, good results have been achieved utilizing approximately a vertical band that is approximately two inches in width. This width provides sufficient circulation and exchange of the liquid media while allowing the flexibility desired for the placement of the internal dividers 50 to create internal compartments 35 of desired size to accommodate different media types in adjacent internal compartments 35. Those skilled in the art will recognize that the plurality of apertures 25 could be placed along the circumference of the wall 10 in numerous different widths.

Still referring to FIG. 4, the top 20 is generally annular in shape and is sized so as to substantially covering the opening 7. The top 20 is manufactured from a suitable durable material such as but not limited to plastic. The top 20 is manufactured from a first layer 21 and a second layer 22. The second layer 22 is rotatably superposed the first layer 21 utilzing suitable mechanical techniques such as but not limited to a pin. The first layer 21 and second layer 22 each have a generally pie-shaped portion opening 23, 24 of approximately equivalent size. The first layer 21 and second layer 22 are rotatably mounted so as to allow the user to either completely close the opening 7 or be positioned so as to provide access to at least one of the internal compartments 35. Those skilled in the art will recognize that the first layer 21 and second layer 22 of the top 20 could be rotatably secured utilizing numerous types of mechanical fasteners. The top 20 further includes a slot 28 journaled through the first layer 21 and second layer 22. The slot 28 is generally ring-shaped and functions to engage a portion of the keepers 60 and further functions to allow a vertical movement of the keepers 60. No particular width is required for the slot 28 and it is further contemplated within the scope of the present invention that more than one slot 28 could be present in the top 20 so as to engage the keepers 60 of the internal dividers 50.

As shown in particular in FIG. 4, releasably secured to the wall 10 are a plurality of external compartments 70. The external compartments 70 are formed utilizing a plurality of walls 71, bottom 72 and a top 73 so as to provide storage for accessory items such as but not limited to hooks and/or weights. The top 73 is hingedly secured utilizing suitable mechanical fasteners. The external compartments 70 are formed in a mateable arcuate manner with the wall 10 so as to facilitate the releasable securing to the wall 10. It is contemplated within the scope of the present invention that the external compartments 70 could be formed in numerous different shapes so as to be mateable with the shape of the wall 10.

Referring in particular to FIG. 1, an end view of an exemplary internal divider 50 is illustrated therein. The internal divider 50 is sealably and releasably secured against the internal circumference 49 of the interior volume 5. The internal divider 50 further includes a first layer 51, second layer 52 and third layer 53. The second layer 52 is intermediate the first layer 51 and third layer 53. The first layer 51, second layer 52 and third layer 53 are manufactured from a suitable durable material such as but not limited to plastic. The internal dividers 50 function to allow the user to create a plurality of internal compartments 35 as shown in particular in FIG. 3. Depending upon the type of bait to be stored and transported, the internal dividers 50 are releasably secured within the interior volume 5 of the live bait container 100 so as to create a suitable size of internal compartment that will facilitate an improved environment for the bait disposed therein having an internal compartment 35 suitably sized therefore. Additionally, the internal dividers 50 permit the user to store different types of live bait within the internal compartments 35 that are stored in different medias. For example but not by way of limitation, a user can utilize the internal dividers 50 to create adjacent internal compartments 35 wherein one internal compartment 35 has water disposed therein to store live bait and the adjacent internal compartment 35 has soil. As discussed later herein, the internal divider 50 can be in its first mode so as to fluidly isolate the internal compartment 35 that is adjacent to another internal compartment 35 that has fluid disposed therein. The internal dividers 50 are manufactured in two different lengths. As shown 3, the internal dividers 50 are manufactured such that the internal dividers 50 are approximately equal to the diameter of the interior volume 5 or are generally equal to approximately half of the length of the diameter of the interior volume 5. These two lengths of internal dividers allow the user to create at least two internal compartments 35. An exemplary configuration of the internal dividers in FIG. 3 utilizes a centrally located mounting rod 99 manufactured of a suitable durable material that extends from the bottom 15 to approximately the upper perimeter edge 19. The mounting rod 99 is manufactured from a suitable durable material and facilitates the placement of internal dividers 50 that are approximately one-half the length of the diameter of the interior volume 5 to be utilized to create a plurality of internal compartments 35. It is contemplated within the scope of the present invention that the mounting rod 99 not be required to facilitate the orientation and placement of the internal dividers 50. The internal dividers 50 are releasably secured to the internal surface 2 of the wall 10 utilizing suitable durable fasteners. Additionally, it is contemplated within the scope of the present invention that an internal divider 50 being generally the length of the diameter of the interior volume 5 could be utilized to bisect the interior volume into two internal compartments 35 wherein such a configuration would not require the utilization of a central mounting rod 99. It is contemplated within the scope of the present invention that numerous different lengths of the internal dividers could be utilized so as to divide the interior volume 5 into a plurality of internal compartments 35.

Illustrated in particular in FIG. 2 is a side view of the first layer 51 and third layer 53 of the internal divider 50. The first layer 51 and third layer 53 are identically constructed. The first layer 51 and third layer 53 are generally rectangular in manner and are manufactured of a suitable durable material such as but not limited to plastic. The first layer 51 and third layer 53 further include a plurality of apertures 57 configured to allow media such as but not limited to water to flow therethrough. A seal 59 is circumferentially mounted to the first layer 51, second layer 52 and third layer 53. The seal 59 is manufactured from a suitable resilient material such as but not limited to silicon. The seal 59 functions to fluidly isolate an internal compartment 35 that is adjacent to an internal compartment 35 that has fluid disposed therein. The seal 59 substantially inhibits the flow of any liquid media therebetween when the second layer 52 is in its first position. In its first position, the plurality of apertures 57 of the second layer 52 are not in alignment with the plurality of apertures 57 of the first layer 51 and third layer 53. Those skilled in the art will recognize that the seal 59 could be formed in numerous different manners and utilize many different types of materials in order to perform the desired functionality described herein. Disposed proximate the top 54 of the first layer 51 and second layer 53 is slot 56. The slot 56 is operable to engage the lateral wings 90,91 of the keeper 60. In its first position, the second layer 52 is position such that the lateral wings 90,91 will engage the slot 56 of the first layer 51 and third layer 53. Ensuing the engagement of the lateral wings 90,91 with the slot 56 of the first layer 51 and third layer 53, the second layer 52 is held in a position such that the plurality of apertures 97 of the second layer 52 are not in alignment with the apertures 57 of the first layer 51 and third layer 53. This in conjunction with the seal 96 of the second layer 52 substantially inhibits that flow of any liquid media through the internal divider 50. The seal 96 of the second layer 52 is constructed similar to seal 59 and functions to fluidly seal the second layer 52 around its circumferential edge 93.

The second layer 52 is movably mounted utilizing spring 80. The spring 80 is a conventional resilient spring that is operable to bias the second layer 52 in a second position subsequent the keeper 60 being rotated to its second position such that the lateral wings 90,91 disengage the slots 56 of the first layer 51 and second layer 53. Subsequent the second layer 52 being placed in its second position, the apertures 97 and apertures 57 are in general alignment thus permitting the flow of any liquid media therethrough. The positionable internal dividers 50 facilitate the customization of the internal compartments 35 of the live bait container 35 allowing the internal compartments 35 to be configured to be fluidly isolated or to be fluidly connected.

The keeper 60 is rotatably mounted to the top 87 of the second layer 52 utilizing suitable durable fasteners. The keeper 60 is manufactured from a suitable durable material such as but not limited to plastic and includes lateral wings 90,91 that are integrally formed and extend perpendicular therefrom in opposing directions. As described herein, the lateral wings 90,91 function to engage the slot 56 of the first layer 51 and third layer 53 so as to maintain the second layer 52 in its first position. While in the preferred embodiment illustrated herein the keeper 60 is utilized to maintain the second layer 52 in its first position, it is contemplated within the scope of the present invention that the second layer 52 could be placed in its first position utilizing numerous types of mechanical fasteners.

An advantage of fluid connection allows two types of bait that live in the same type of media such as saltwater but are not compatible to be stored within the live bait container 100. Additionally, the positionable internal dividers 50 facilitate at least a third type of live bait to be stored therein in a solid media wherein the solid media is isolated from the liquid media in which the first two types of bait are disposed.

Referring in particular to FIG. 4, a handle 61 is illustrated therein. The handle 61 is secured to the live bait container 100 utilizing suitable durable fasteners and is pivotally mounted thereto. The handle 61 is manufactured from a suitable durable material such as but not limited to metal. While not illustrated herein, it is further contemplated within the scope of the present invention that the live bait container 100 could utilize a conventional pair of wheels and a telescoping handle to aid in the transportation thereof.

Referring in particular to the figures herein, a description of the operation of the live bait container 100 is as follows. In use, a user will secure at least one internal divider 50 within the interior volume 5 of the live bait container 100 creating internal compartments 35. At least one type of live bait and its storage media, fresh or salt water, is disposed within one of the internal compartments. The second layer 52 of the internal divider 50 is in its first position such that the lateral wings 90,91 are engaged with slots 56 of the first layer and third layer. In this position apertures 57 and apertures 97 are not in alignment and in conjunction with the seal 96 the media disposed in an internal compartment 35 is substantially inhibited from entering an adjacent internal compartment 35. If a user desires to have the media flow into an adjacent internal compartment 35, the keeper 60 is rotated so as to disengage the lateral wings 90,91 and the spring 80 upwardly biases the second layer 52 so as to generally align apertures 57 and apertures 97 thereby allowing a liquid media to flow therethrough.

What is claimed is:

1. A bait container comprising:
    a body, said body having at least one wall and a bottom contiguously formed to create an interior volume having a first storage compartment, said body further including an opening providing access to said interior volume, said body being manufactured from a generally rigid material, said body having a first end and a second end;
    a first internal divider, said first internal divider being releasably secured within said first storage compartment, said first internal divider operable to partition said first storage compartment into two compartments, said first internal divider being comprised of a first layer, a second layer and a third layer, said second layer being movably mounted with respect to said first layer and said third layer, said first internal divider having a first position and a second position; and
    wherein in said second position, said first internal divider operable to fluidly connect said two compartments.

2. The bait container as recited in claim 1, wherein said first layer, said second layer and said third layer of said internal divider further include a plurality of apertures, said plurality of apertures being in general alignment in said second position of said internal divider.

3. The bait container as recited in claim 2, and further including a keeper, said keeper being operably coupled to said second layer of said internal divider, said keeper being superposed said second layer, said keeper having a first position and a second position, said keeper in said second position operable to engage said first layer and said third layer so as to maintain said internal divider in said second position.

4. The bait container as recited in claim 3, and further including a top, said top being of similar size and shape of said opening, said top being releasably secured to said body, said top further including a slot, said slot operable to receive therein a portion of said keeper.

5. The bait container as recited in claim 4, and further including a row of apertures, said row of apertures being journaled through said at least one wall of said body, said row of apertures extending from said first end to said second end, said row of apertures operably to fluidly connect one of said two compartments with water in which the bait container may be disposed.

6. The bait container as recited in claim 5, wherein said top further includes a first layer and a second layer, said second layer being superposed said first layer, said second layer being rotatably mounted to said first layer, said first layer and said second layer of said top each having an opening of approximately equivalent size.

7. The bait container as recited in claim 6, wherein said first layer, said second layer and said third layer of said internal divider further include a seal, said seal operable to fluidly isolate said two compartments in said first position of said internal divider.

8. A live bait container operable to store at least two types of live bait wherein the two types of live bait are stored in different media comprising:
a storage compartment, said storage compartment having one wall and a bottom forming an interior volume, said interior volume further including an opening providing access thereto, said storage compartment being generally annular in shape, said storage compartment having a first end and a second end;
a top, said top being releasably secured to said storage compartment proximate said opening, said top being generally annular in shape, said top having a slot, said slot being generally ring-shaped;
a plurality of internal dividers, said plurality of internal dividers being releasably secured within said interior volume of said storage compartment, said plurality of internal dividers operable to separate said storage compartment into a plurality of sections, said plurality of internal dividers having a first layer, a second layer and a third layer, said second layer being intermediate said first layer and said third layer, said second layer being movable between a first position and a second position; and
wherein said plurality of internal dividers are operable to fluidly isolate said plurality of sections upon said second layer of said plurality of internal dividers being in said first position.

9. The live bait container as recited in claim 8, wherein said first layer, said second layer and said third layer of said plurality of internal dividers further include a multitude of apertures, said multitude of apertures being in general alignment upon said second layer of said plurality of internal dividers being in said second position.

10. The live bait container as recited in claim 9, wherein said plurality of said internal dividers are operable to fluidly couple at least two of said plurality of sections subsequent said second layer of one of said plurality of internal dividers being placed in said second position.

11. The live bait container as recited in claim 10, wherein said plurality of said internal dividers further include a seal, said seal being secured around the perimeter of said first layer, said second layer and said third layer, said seal operable to fluidly isolate said plurality of sections.

12. The live bait container as recited in claim 11, and further including a keeper, said keeper being rotatably mounted to said second layer of said plurality of internal dividers, said keeper having a first position and a second position, said keeper operable to engage said first layer and said second layer, wherein in said first position said keeper operable to maintain said second layer of said plurality of internal dividers in said first position.

13. The live bait container as recited in claim 12, and further including a spring, said spring being operably coupled to said second layer of said plurality of internal dividers, said spring operable to bias said second layer of said plurality of internal in said second position.

14. The live bait container as recited in claim 13, wherein at least a portion of said keeper is operable to journal through said slot of said top subsequent said second layer of said plurality of internal dividers is placed in said second position.

15. A live bait container having a plurality of compartments operable to transport and store at least two different types of live bait wherein the two different types of live bait are disposed in different medias and wherein the live bait container is operable to fluidly couple at least two of the plurality of compartments comprising:
a storage compartment, said storage compartment including a wall having a bottom integrally formed therewith forming an interior volume, said wall being manufactured from a rigid material and being generally annular in shape, said storage compartment having a lower end and an upper end, said storage compartment having an opening proximate said upper end providing access to said interior volume, said wall further including a vertical band of apertures, said vertical band of apertures extending substantially between said lower end and said upper end, said vertical band of apertures operable to fluidly connect at least a portion of said interior volume with a fluid in which the live bait container is disposed;
a plurality of internal dividers, said plurality of internal dividers being generally rectangular in shape, said plurality of internal dividers operable to divide said storage compartment into a plurality of sections, said plurality of internal dividers having a first layer, a second layer and a third layer, said first layer, said second layer and said third layer having a multitude of apertures bored therethrough, said first layer, said second layer and said third layer having a circumferential edge, said second layer being movably mounted with respect to said first layer and said third layer, said second layer having a first position and a second position;
a top, said top said top being of suitable size to substantially cover said opening, said top being generally annular in shape, said top having a first layer and a second layer, said second layer being superposed said first layer, said second layer being rotatably mounted to said first layer, said top having a ring shaped slot journaled therethrough; and
wherein in said second position said multitude of apertures of said second layer are in general alignment with said multitude of apertures of said first layer and said third layer so as to fluidly couple adjacent plurality of sections.

16. The live bait container as recited in claim 15, and further including a seal, said seal being secured to the circumferential edge of said first layer, said second layer and said third layer, said seal operable to fluidly isolate adjacent plurality of sections subsequent said second layer being placed in said first position.

17. The live bait container as recited in claim 16, and further including a keeper, said keeper being rotatably mounted to said second layer of said plurality of internal dividers, said keeper further including a first lateral wing and a second lateral wing, said first lateral wing and said second lateral wing extending perpendicular from said keeper, said first lateral wing and said second lateral wing extending from opposing sides of said keeper, said keeper operable to maintain said second layer in said first position.

18. The live bait container as recited in claim 17, and further including a spring, said spring being operably coupled to said second layer, said spring operable to transition said second layer from said first position to said second position, said spring operable to maintain an upward force on said second layer so as to maintain said second layer in said second position.

19. The live bait container as recited in claim 18, and further including a pair of slots, said slots being generally rectangular in shape, said slots being located in said first layer and said second layer of said plurality of internal dividers, said pair of slots operable to receive said first lateral wing and said second lateral wing of said keeper.

20. The live bait container as recited in claim 19, and further including an external storage container, said external storage container being releasably secured to said wall proximate said upper end, said external storage container being generally arcuate in shape having a mateable radius with said wall.

* * * * *